United States Patent
Adler et al.

(10) Patent No.: US 8,908,866 B2
(45) Date of Patent: *Dec. 9, 2014

(54) METHOD AND APPARATUS TO PROVIDE AUTHENTICATION AND PRIVACY WITH LOW COMPLEXITY DEVICES

(75) Inventors: Joseph A. Adler, Mountain View, CA (US); David M'Raihi, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 281 days.

This patent is subject to a terminal disclaimer.

(21) Appl. No.: 13/446,024

(22) Filed: Apr. 13, 2012

(65) Prior Publication Data

US 2014/0301551 A1  Oct. 9, 2014

Related U.S. Application Data

(63) Continuation of application No. 11/761,273, filed on Jun. 11, 2007, now Pat. No. 8,171,289.

(60) Provisional application No. 60/812,386, filed on Jun. 9, 2006.

(51) Int. Cl.
*H04L 29/06* (2006.01)
*H04L 9/32* (2006.01)
*G06F 7/72* (2006.01)

(52) U.S. Cl.
CPC ............. *H04L 9/3271* (2013.01); *G06F 7/725* (2013.01); *H04L 2209/805* (2013.01)
USPC ............ 380/277; 380/28; 380/30; 726/30; 713/193; 713/194; 713/189; 713/171; 713/172; 713/174; 713/168; 713/159; 713/155

(58) Field of Classification Search
CPC ............. H04L 9/3271; H04L 9/3247; H04L 2209/805; G06F 2221/2103; G06F 7/725
USPC ......... 380/28, 30, 277; 726/30; 713/193–194, 713/189, 171–172, 174, 168, 159, 155
See application file for complete search history.

(56) References Cited

U.S. PATENT DOCUMENTS

| | | | |
|---|---|---|---|
| 6,073,234 A | 6/2000 | Kigo et al. |
| 6,178,377 B1 | 1/2001 | Ishihara et al. |
| 6,567,832 B1 | 5/2003 | Ono et al. |
| 6,611,738 B2 | 8/2003 | Ruffner |
| 6,842,106 B2 | 1/2005 | Hughes et al. |
| 7,450,010 B1 | 11/2008 | Gravelle et al. |
| 7,791,451 B2 | 9/2010 | Lei et al. |

(Continued)

OTHER PUBLICATIONS

Aigner et al., Secure Symmetric Authentication for RFID Tags. In: Telecommunications and Mobile Computing 2005 (TCMC2005) Graz, Austria (Mar. 8-9, 2005).

(Continued)

*Primary Examiner* — Eleni Shiferaw
*Assistant Examiner* — Hilary Branske
(74) *Attorney, Agent, or Firm* — Lowenstein Sandler LLP (57) ABSTRACT

A method and apparatus to provide a cryptographic protocol for secure authentication, privacy, and anonymity. The protocol, in one embodiment, is designed to be implemented in a small number of logic gates, executed quickly on simple devices, and provide military grade security.

9 Claims, 9 Drawing Sheets

(56) References Cited

U.S. PATENT DOCUMENTS

| | | | |
|---|---|---|---|
| 7,952,466 B2* | 5/2011 | Kelley et al. | 340/10.3 |
| 2004/0001590 A1 | 1/2004 | Eisentraeger et al. | |
| 2005/0058294 A1* | 3/2005 | Chen et al. | 380/277 |
| 2006/0174126 A1 | 8/2006 | Crandall et al. | |
| 2006/0291649 A1 | 12/2006 | Crandall et al. | |
| 2007/0028106 A1* | 2/2007 | Lauter et al. | 713/171 |
| 2007/0106897 A1* | 5/2007 | Kulakowski | 713/171 |
| 2007/0122004 A1* | 5/2007 | Brown et al. | 382/115 |
| 2007/0174618 A1 | 7/2007 | Nakano et al. | |
| 2007/0250704 A1 | 10/2007 | Hallam-Baker | |
| 2009/0019282 A1 | 1/2009 | Arditti et al. | |

OTHER PUBLICATIONS

Ari Juels, "Minimalist Cryptography for Low Cost RFID Tags," RSA Laboratories, 29 pages.

Istvan Vajda, et al. "Lightweight Authentication Protocols for Low-Cost RFID Tags" Aug. 5, 2003, 10 pages.

Darrel Hankerson, et al. "Software Implementation of Elliptic Curve Cryptography Over Binary Fields" 24 pages.

Sanjay Sarma, White Paper "RFID Systems, Security & Privacy Implications," Auto-ID Center, Massachusetts Institute of Technology, Cambridge, MA, USA, Published Nov. 1, 2002, 17 pages.

Sanjay Sarma, White Paper, "Towards the 5c Tag," Auto-ID Center, Massachusetts Institute of Technology, Cambridge, MA, USA published Nov. 1, 2001, 19 pages.

Damth C. Ranasinghe, et al., "Los-Cost RFID Systems: Confronting Security and Privacy," 8 pages.

Tim Kerins, et al., "Fully Parameterizable elliptical Curve Cryptography Processor over GF(2)" University College Cork, Cork City, Ireland, 10 pages.

Butler W. Lampson, "Computer Security in the Real World," Microsoft, 12 pages.

Mark Harrison, et al. "AUTOIDLABS-WP-BIZAPPS-014," Auto-ID Labs, Information management in the product lifecycle—The role of networked RFID. White Paper Series / Edition 1, copyright Sep. 2005, coverpage and pp. 1-12.

Jonathan Lutz, et al., High Performance Elliptical Curve Cryptographic Co-processor, (Pieces of this work was presented at SPE 2003 [19] and ITCC 2004 [20]), pp. 1-37.

Non-Final Office Action for U.S. Appl. No. 11/761,273 mailed Jan. 4, 2011.

Non-Final Office Action for U.S. Appl. No. 11/761,273 mailed Jun. 21, 2011.

Notice of Allowance for U.S. Appl. No. 11/761,273 mailed Dec. 28, 2011.

* cited by examiner

Notes:
1. All computations are performed on elliptic curves over finite fields (as described in the prerequisite section).
2. The tag id value n must be shorter than the length of the keys

Notes:
1. All computations are performed within a well known elliptic curve E over a well known finite field $\mathscr{F}_q$.
2. The operator "⊕" means the result of performing an exclusive or (XOR) on the two operands.
3. The public key "x" does not need to be transmitted as part of the protocol, but instead an identifier for the public key can be transmitted.
4. The tag id value n must be shorter than the length of the keys
5. The function g() computes a string long enough to XOR with n | A.

Fig. 8

METHOD AND APPARATUS TO PROVIDE AUTHENTICATION AND PRIVACY WITH LOW COMPLEXITY DEVICES

RELATED CASES

The present application is a continuation of U.S. Non-Provisional patent application Ser. No. 11/761,273, filed Jun. 11, 2007 now U.S. Pat. No. 8,171,289, which claims priority to U.S. Provisional Patent Application Ser. No. 60/812,386, filed Jun. 9, 2006.

FIELD OF THE INVENTION

The present invention relates to encryption and authentication, and more particularly to encryption and authentication in low complexity devices.

BACKGROUND

Radio-frequency identification (RFID) tags are becoming more common. They are being used for tracking products, and other objects. Generally, when an RFID is queried, it supplies its identity, which can then be used to look up data about the object to which the RFID is attached.

However, some entities wish to be able to use RFID, without disclosing the RFID data to third party inquiries. For example, the US Government would like to embed RFID chips into passport documents or credit-card size cards to help expedite processing of identification documents at US border crossings.

The current RFID solutions have four primary vulnerabilities. First, the RFID generally does not provide authentication. Secondly, an unauthorized party could query a device and learn the data on the RFID chip, which in the case of the passport may include sufficient data about the identity of its holder to enable identity theft. Third, an attacker could eavesdrop on the dialog with the device and obtain the data on the RFID chip in that way. Finally, an attacker could consistently track a person using a unique identifier for the RFID chip.

SUMMARY OF THE INVENTION

A method and apparatus to provide a cryptographic protocol for secure authentication, privacy, and anonymity in a low-complexity device is described. The protocol, in one embodiment, is designed to be implemented in a small number of logic gates, executed quickly on simple devices, and provide military grade security.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The method and apparatus described is a cryptographic protocol for low power devices that addresses a number of security requirements. The cryptographic protocol also preserves the performance characteristics for this application. In particular, the device including the cryptographic protocol can be built relatively inexpensively using standard technology. It does not require a large number of logic gates to implement, so it can be implemented on low power devices such as passive RFID chips. Finally, the protocol allows a large number of devices to be queried simultaneously.

This protocol includes the ability to provide one or more of the following cryptographic features:

Authentication. The protocol can include information for cryptographically checking the authenticity of a tag.

Privacy. The protocol can protect the identifier of the tag so that an unauthorized party cannot learn the identifier for the tag.

Untraceability/Obfuscation: The protocol in one embodiment never returns exactly the same value. This means that, if a reader does not know the key to learn the identifier for a tag, the reader can't even tell that it is communicating with the same tag.

In one embodiment, authentication is provided through Elliptic Curve Cryptography (ECC), and more specifically an elliptic curve encryption process using a public/private key pair. In one embodiment, privacy is provided by encrypting the tag identifier. In one embodiment, the encryption is done using a Diffie-Helman based mechanism to derive an encryption key for the tag identifier, and encrypting the tag identifier with this key. In one embodiment, untraceability is provided by generating a random number for each exchange that is used for producing the encryption key.

In one embodiment, the present application may be implemented using computations over a prime field. For simplicity, some examples simply discuss the elliptic curve cryptography (ECC) or the Diffie-Helman problem for prime fields. However, one of skill in the art would understand that either method, or a combination of the two methods, may be used by the present invention.

Note that while the examples in the present application describe a system implemented using a radio-frequency identity (RFID) reader and tag, the present invention may be utilized with any low-complexity device.

Figure 1:
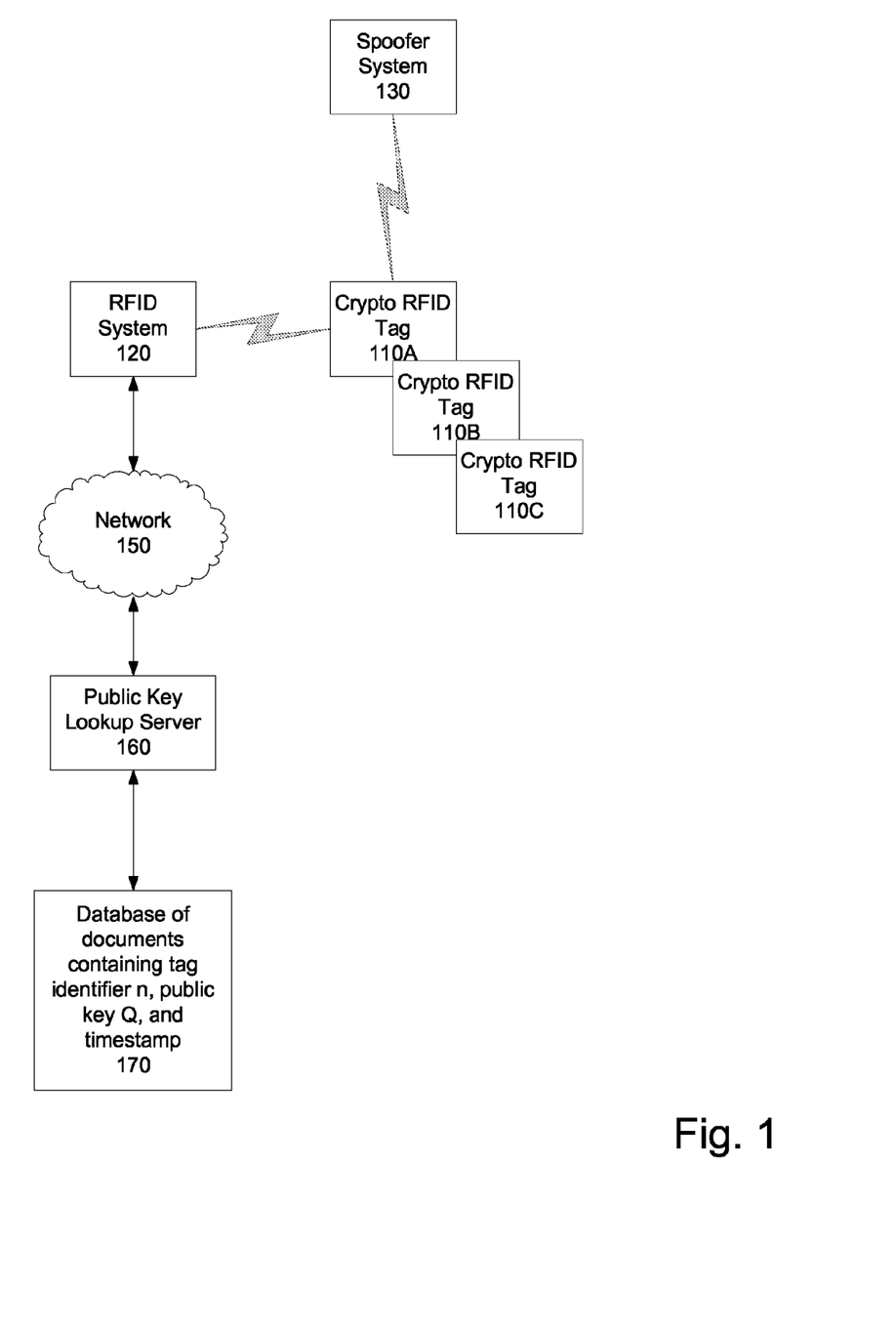
FIG. 1 is a network diagram of one embodiment of the components of the cryptographic service in accordance with the present invention.

FIG. 1 is a network diagram of one embodiment of the components of the cryptographic service in accordance with the present invention. The RFID system 120, in one embodiment, includes a reader to read one or more crypto-RFID tags 110A, 110B, 110C. In one embodiment, the RFID system 120 is capable of reading multiple RFID tags 110A-C simultaneously. In another embodiment, each tag is interrogated in turn. The RFID system 120, in one embodiment, includes a cryptographic system. In another embodiment, the RFID system 120 may be linked to a cryptographic system to perform the cryptographic functions described herein in association with the reader.

The reader 120 requests the tag ID from a crypto RFID tag 110A. In one embodiment, the request includes a challenge. The reader returns an encrypted response. The encrypted response can be decrypted by a system 120, which has the proper keys. A spoofer system 130, regardless of how often it sends a request for a tag ID, will not receive consistent responses (because the responses will be encrypted and obfuscated). Therefore, the spoofer system 130 would not be able to identify the tag ID of the crypto RFID tag 110A, and thus would be unable to look up data associated with the RFID tag 110A.

In one embodiment, after decrypting the tag response and obtaining the tag ID, the RFID system 120 looks up a public key associated with a tag ID. In one embodiment, the public key look-up may be performed by a remote system 160 accessible via network 150. Alternately, the key lookup may be a local system, or incorporated within the RFID system 120 itself. In one embodiment, public key look-up server 160 may be local to the RFID system 120. In one embodiment, public key look-up server 160 may be a private server that is not accessible to the public.

In one embodiment, the record in the database 170 for each RFID tag includes the tag identifier (tag ID) and the tag public key Q. In one embodiment, the record may also include a time stamp indicating when the RFID was created. Note that therefore, this data does not include the tag's private key, which is never stored outside the tag itself.

Figure 2:
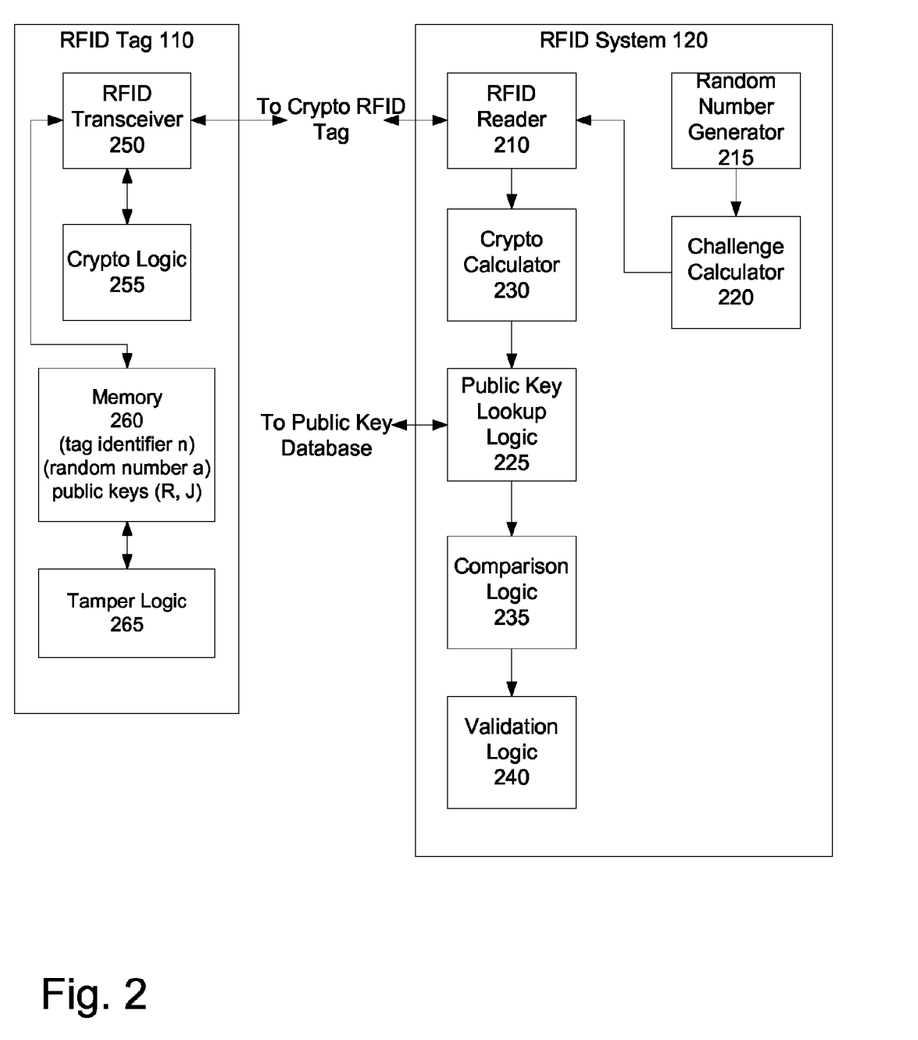
FIG. 2 is a block diagram of one embodiment of the server and client which may implement the cryptographic protocol of the present invention.

FIG. 2 is a block diagram of one embodiment of the low processing power system (LPPS) and associated communication system. The LPPS may be an RFID tag, while the communication system may be an RFID reader.

The RFID tag 110 includes a transceiver 250, or alternately separate receiving and transmitting logics. In one embodiment, the transceiver 250 is an RFID transceiver. In one embodiment, the RFID tag 110 may be sufficiently low powered that the transceiver 250 is powered by the incoming signals received from system 120.

During initialization, crypto logic 255 calculates a private key for the tag 110, which is stored in memory 260. Note that the term private key in this specification may refer to a point on an elliptic curve or a large prime number used in Diffie-Helman problems. A public key is the function or value which provides the key pair to the private key.

RFID tag 110 receives a public key, or in another embodiment multiple product keys, from the RFID system 120. The RFID tag 110 also receives its tag identifier (tag ID) from the system 120, and stores them in memory 260. In one embodiment, the private key is a value of the same length as the order of E(F), and is randomly generated. Crypto logic 255 in tag 110 further calculates the RFID tag's public key based on the tag's private key. This public key, in one embodiment signed by a certification authority, is used for authenticating the RFID tag 110.

Memory 260 is used to store the private key (random number a, generated within the tag), as well as the tag ID and the public key(s) of the reader (received during initialization). The number of gates required to store the private key, public key(s), and tag ID, and compute the authentication function is proportional to the length of the keys. Therefore, minimizing key size, while ensuring security, is of interest. Therefore, in one embodiment, the system uses a ternary field as F, which enables the reduction of word size from 163 in a binary field to 107 in a ternary field, an approximately 35% reduction in word length without reducing the security of the system. This means that, by using ternary logic gates instead of binary logic gates, fewer logic gates would be required, and that some operations (such as multiplication) would be faster.

In one embodiment, the system includes tamper logic 265. Tamper logic 265 provides tamper-resistance. In one embodiment, the entire tag is tamper resistant. In another embodiment, only the memory 260, or portion of memory storing the private key, is tamper resistant. In one embodiment, tamper resistance may include logic that erases the memory if the system detects an attempt to read the memory, hack the bus, etc. This may be implemented, in one embodiment, using fuses.

During use for authentication, crypto logic 255 receives a challenge, and calculates a response to the challenge. The response to the challenge is an encrypted, authenticated, and obfuscated response, which ensures that the response from the RFID tag 110 is always different, even if the same challenge is sent repeatedly. The calculations, in one embodiment, are done over the selected elliptic curves over the selected finite fields. As noted above, this field in one embodiment is a known binary field.

The RFID system 110 includes an RFID reader 210, which sends a challenge to the RFID tag 110. The challenge is generated by challenge calculator 220, based on a random number created by random number generator 215. In one embodiment, the random number is a number of a similar order of magnitude to the order of E.

When the RFID tag 210 responds to the challenge, the response includes the encrypted tag ID and the challenge response. The crypto calculator 230 is used to decrypt the encrypted response, and obtain the tag ID from the response. The public key lookup logic 225 uses the tag ID to look up the tag's public key in a database. As noted above the database may be part of the RFID system 120, local, or remote and accessible via a network.

The crypto calculator 230 takes the random number and using the public key calculates the public key value. The public key value should be equal to the challenge response returned by the RFID tag. Therefore, comparison logic 235 performs a comparison between the challenge response returned by the RFID tag 210, and the result of the calculation. If the values are identical, then the RFID system 120 certifies the RFID tag 210. In one embodiment, validation logic 240 outputs the proper information indicating that the RFID tag 110 has been validated. In one embodiment, the RFID system 120 has an output mechanism to indicate that the RFID tag 110 is valid.

Figure 3:
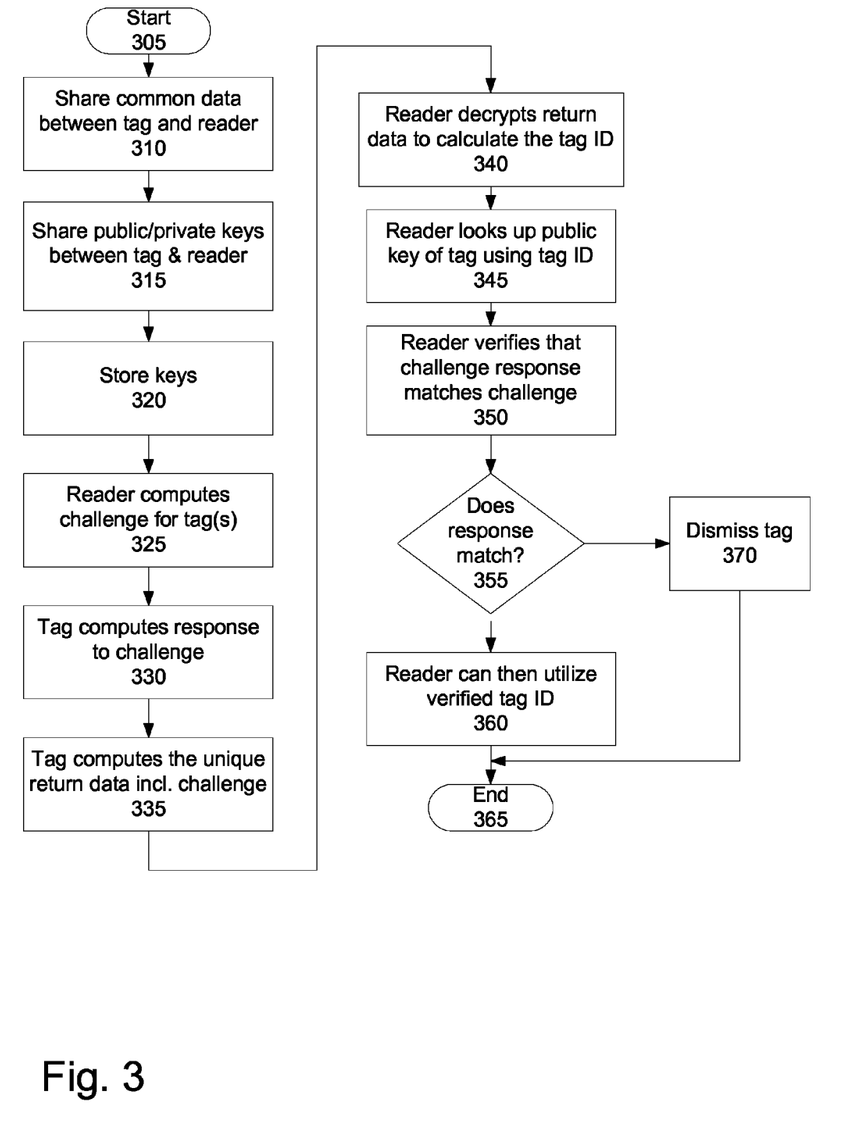
FIG. 3 is an overview flowchart of one embodiment of utilizing the cryptographic protocol.

FIG. 3 is an overview flowchart of one embodiment of utilizing the cryptographic protocol. The process starts with initialization at 305.

At block 310, the common data is shared between a tag and reader. The tag may be any low-complexity processing device, for example a radio-frequency identification (RFID) tag. A reader may be any device designed to interface with the tag, such as an RFID reader. In one embodiment, the term "reader" refers to the system which interacts with the tag, as well as the system which provides cryptographic services. However, in one embodiment, these functions may be separated, and may be performed by separate devices coupled through a network connection or in other ways. The common data defines the necessary elliptic curves, fields, and points for elliptic encryption, or the generators and large primes for traditional encryption. The term "originator" is used in this patent to refer to the generator for a large prime and to the point in an elliptical field used for elliptical curve encryption.

At block 315, the keys are shared between the tag and reader. In one embodiment, the keys include one or more public/private key pairs, which may utilize elliptical encryption or traditional large-primes encryption. In one embodiment, three key pairs are created, one each for authentication, encryption, and obfuscation. In one embodiment, the tag creates its own keys.

Once the appropriate private keys and public keys are stored, at block 320, the initialization is complete. In one embodiment, tag stores the reader's public key and its own private key and identification (n), and the reader stores its own private key. In one embodiment, the tag's public key and identification (n) are stored in a separate public key directory.

The below processes are part of acquiring the tag's public key for identification purposes. The below process, in addition to providing an authenticated tag ID, also provides the tag ID in a manner that encrypts the tag ID, and obscures its value. This ensures that if a spoofing reader attempts to discern the encryption by sending the same challenge multiple times, the returned data is not identical.

At block 325, the reader computes a challenge for the tag. The challenge is designed to elicit information which enables the reader to determine the tag's tag ID. The challenge, in one embodiment, is a random value. In one embodiment, the challenge is a random value along the elliptic curve over the selected finite field.

At block 330, the tag computes a response to the challenge. The response to the challenge, in one embodiment, is the tag's private key times the challenge.

At block 335, the tag computes the return data, which is a combination of the response to the challenge and three random values encrypted with the three keys, one for encryption, one for authentication, and one for privacy. In one embodiment, the tag generates two random values (s and u), and encrypts each with a corresponding key (encryption and obfuscation respectively). The authentication key is encrypted with the reader's public key. The tag then returns a concatenated value including all four random values. In one embodiment, the returned value includes the tag identifier (n).

At block 340, the reader, which has received the return data from the tag, utilizes its private key to compute n (tag ID) from the return data.

At block 345, the reader looks up the public key of the tag, using the tag ID.

At block 350, the reader verifies that the returned data included the signed challenge response. If so, as verified at block 355, the reader knows the tag's ID (n) and that this ID has been authenticated by the response to the challenge. The reader can then, at block 360, utilize the tag ID to perform other activities. For example, the tag ID may be used to look up data in another database, verify authorization for the tag, etc. The process then ends, at block 365.

Figure 4A:
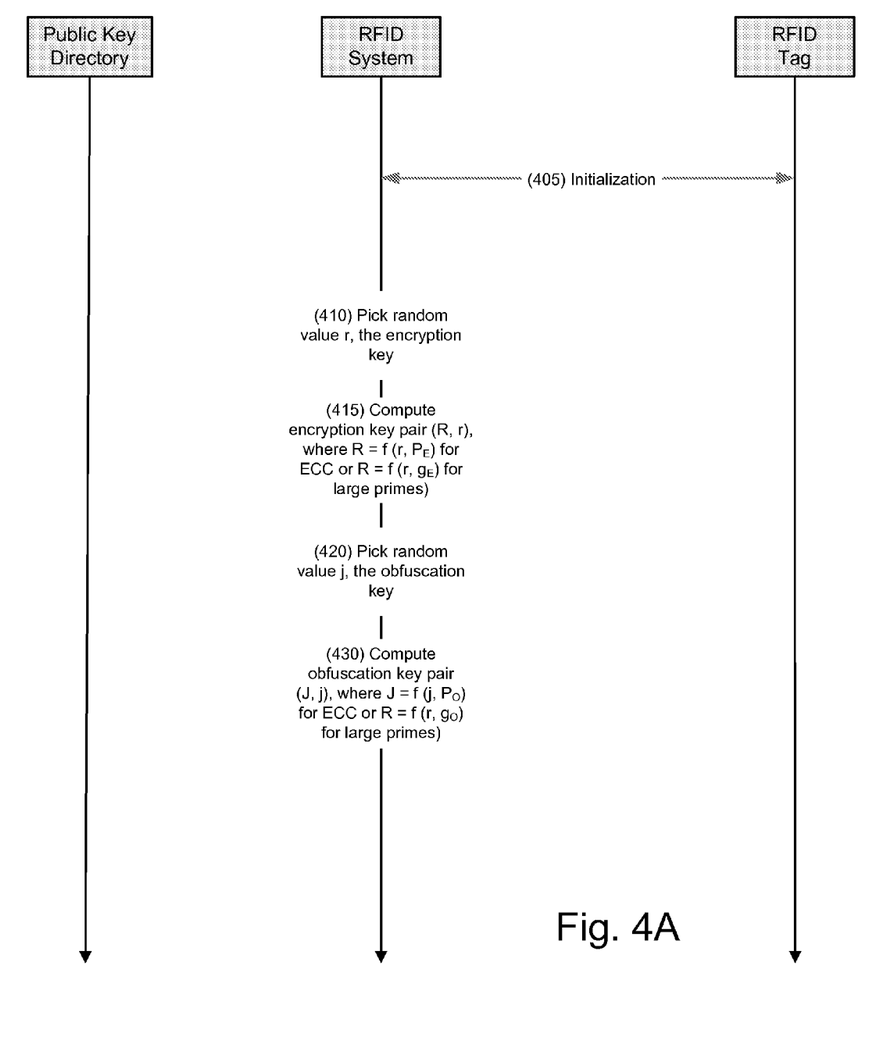
FIGS. 4A and B are signal flow diagrams of one embodiment of initializing a reader and a tag in accordance with the present invention.
Figure 4B:
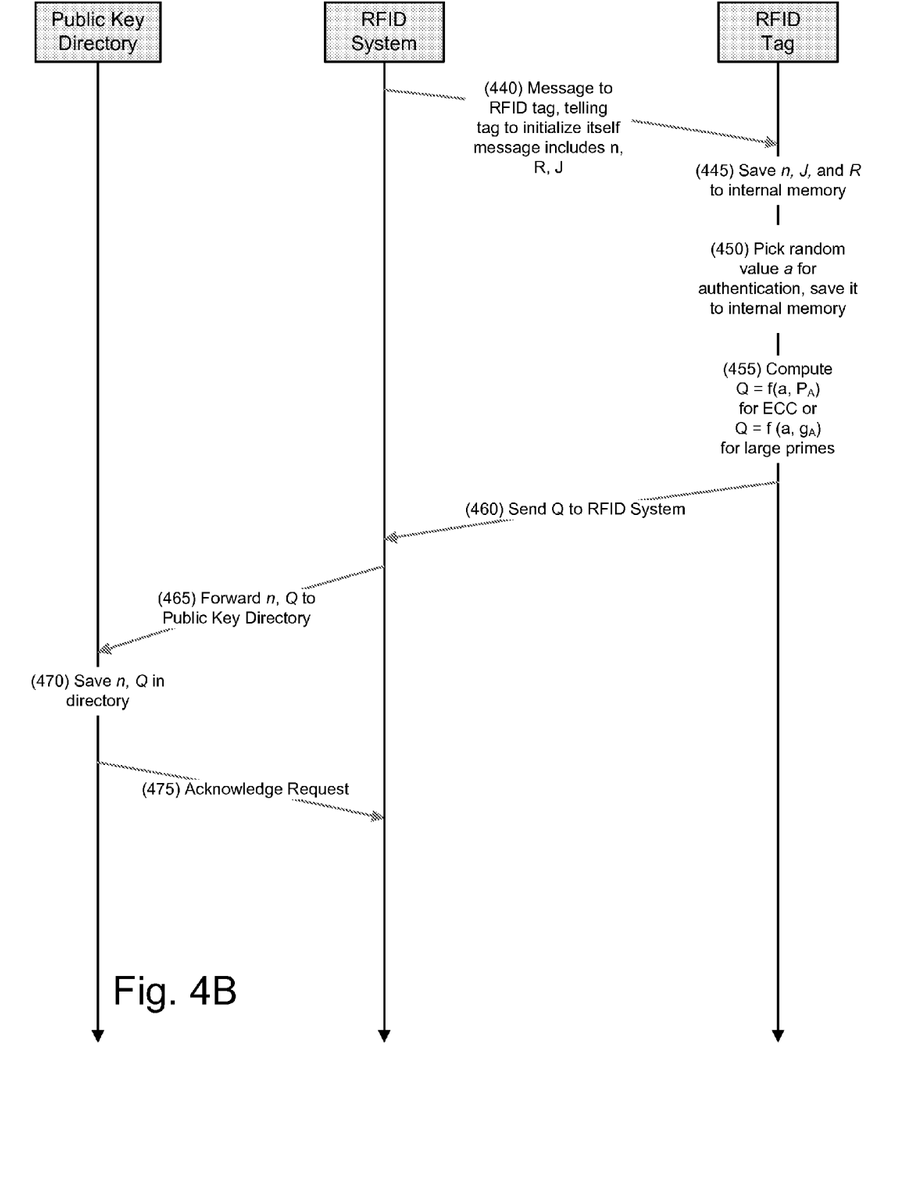

FIGS. 4A and B are signal flow diagrams of one embodiment of initializing a reader and a tag in accordance with the present invention. The system may use elliptic curve cryptography (ECC), or using traditional public-key cryptography parameters.

At block 405, the tag and reader are initialized with cryptographic parameters. If the cryptographic system used is the elliptic curve system, in one embodiment the following values are defined:
1. A first elliptic curve $E_A$, and a finite field $\mathscr{F}_A$ for (tag) authentication.
2. A first point $P_A=(x_A, y_A)$ on first elliptic curve $E_A(\mathscr{F}_A)$ for (tag) authentication.
3. A second elliptic curve $E_E$, and a finite field $\mathscr{F}_E$ for (tag id) encryption.
4. A second point $P_E=(x_E, y_E)$ on the second elliptic curve $E_E(\mathscr{F}_E)$ for (tag id) encryption.
5. A third elliptic curve $E_O$, and a finite field $\mathscr{F}_O$ for (tag id) obfuscation.
6. A third point $P_O=(x_O, y_O)$ on the third elliptic curve $E_O(\mathscr{F}_O)$ for (tag id) obfuscation.

For each of the points, the set of all points that can be generated by multiplying $P_{A/E/O}$ by integers should be similar in size to the total number of points on the elliptic curve over the field. More formally, the order of the set $\{P_i | \exists x \text{ such that } P=P_A^x\}$ must be similar to the order of $E_A(\mathscr{F}_A)$.

In one embodiment, the authentication, encryption, and obfuscation features may utilize separate elliptic curves, finite fields, and or/points on the elliptic curves, as described above. In another embodiment, the defined fields, curves, and/or points may be identical. In one embodiment, the same elliptic curve, field, and points are used for all three cryptographic aspects (authentication, encryption, and obfuscation). These aspects, $E_A, E_E, E_O, \mathscr{F}_A, \mathscr{F}_E, \mathscr{F}_O$, and $P_A, P_E, P_O$ are used to initialize the tag and reader. The one way function for ECC is: $f(a, B)=a \cdot B$, where the dot operator means point multiplication. For example, $a \cdot B$ means "multiply point B by integer a".

For a traditional encryption method, encryption using computations over a large prime field, in one embodiment the following values are defined:
1. Choose a prime $Q_A$ for (tag) authentication.
2. Choose a generator $g_A \in [2, Q_A-1]$ for (tag) authentication.
3. Choose a prime $Q_E$ for (tag id) encryption.
4. Choose a generator $g_E \in [2, Q_E-1]$ for (tag id) encryption.
5. Choose a prime $Q_O$ for (tag id) obfuscation.
6. Choose a generator $g_O \in [2, Q_O-1]$ for (tag id) obfuscation.

In one embodiment, the generators and primes may be identical for each of the values (authentication, encryption, and obfuscation). The one way function for computations over a prime field is:

$$f(a, B) = B^a \bmod p.$$

The generators $g_{A/E/O}$ and points $P_{A/E/O}$ can be collectively referenced as originators $O_{A/E/O}$.

As above, these cryptographic generators are used to initialize the tag and reader. Note that a reader/tag will use one type of encryption. Here, elliptical encryption and computations over a large prime field are described. However, alternative cryptographic functions which generate secure encryption and decryption key pairs may be used.

The initialization may occur in various ways. In one embodiment, all system components are programmed in advance with the same parameters, so that no agreement is needed. In another embodiment, each system component will receive a complete description of which parameters to use for communication. In yet another embodiment, the two sides will briefly specify which parameters to use from a standard set of parameters with well known names. For example, see section 5.1.1 of RFC 4492, available from http://www.faqs.org/rfcs/rfc4492.html, which specifies 16 bit identifiers for some standard elliptic curves and fields. In another embodiment, the two sides will select parameters from an agreed-upon or pre-determined set of parameters. Alternative ways of ensuring that both components have these parameters may be utilized.

At block 410, the reader picks a random value, r, as its encryption key. At block 415, the reader computes the matching key $R=f(r, P_E)$, which is the public key associated with the encryption key r, to create a key pair (R, r).

At block 420, the reader picks a second random value, j, as the obfuscation key. At block 430, the obfuscation key pair (J, j) is computed by calculating $J=f(j, P_o)$. Thus, the reader generates a key pair (R, r), for encryption, and a second a key pair (J, j) for obscuring the identity of the tag. In one embodiment, R=J, and r=j. The values of r and j are stored in the reader.

At block 440, the reader sends the public keys (R and J) along with the tag ID (n) to the tag, telling the tag to initialize itself. In one embodiment, the RFID system selects n to be a random number. In one embodiment, the tag id value n is selected to be shorter than the length of the keys (R and J). In one embodiment, the initialization process may be performed simultaneously with a number of tags.

At block 445, the values of n, R, and J are saved to an internal memory of the tag. As noted above, in one embodiment, the internal memory is a secure memory. In one embodiment, the internal memory cannot be accessed without going through the cryptographic process without destroying the tag.

At block 450, a random value a is selected by the tag as its private key, and saved to internal memory of the tag. The internal memory, in one embodiment, is secure memory. In one embodiment, only the tag ID and the tag's private key are stored in secure memory.

At block 455, the tag computes a public key $Q=f(a, P_A)$. At block 460, the value Q is sent to the reader/system. In one embodiment, the reader/system forwards the tag's public key to a public key directory (block 465). The public key directory stores the value of Q in association with the value n (tag ID), at block 470. At block 475, the public key directory acknowledges that the values were successfully stored.

Figure 5:
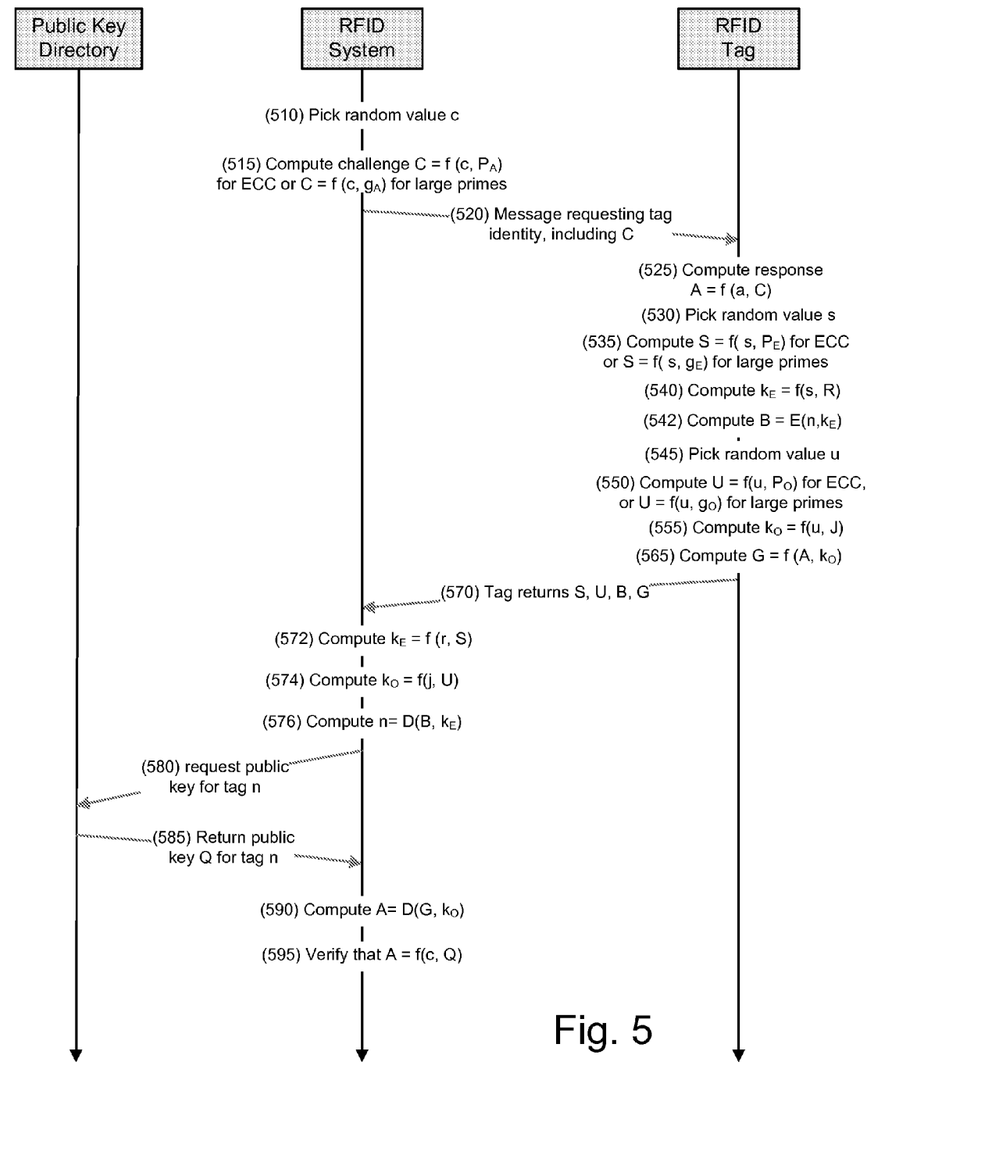
FIG. 5 is a signal flow diagram of one embodiment of using a tag ID protocol for encryption, authentication, and privacy.

FIG. 5 is a signal flow diagram of one embodiment of using a tag ID protocol for encryption, authentication, and obfuscation. This process is initialized when the RFID system wishes to obtain data from a tag. In one embodiment, the RFID system may perform the same process in parallel with more than one RFID tag.

At block 510, the RFID system picks a random value c. At block 515, the RFID system computes the challenge, $C=f(c, P_A)$. The challenge, C, is the pair of random value c. In one embodiment, encryption function E takes the XOR of the plaintext and the key to generate the cipher text. For a message n and point $P_i$, this would be $c=E(m,P_i)=m \oplus bin(P_i)$. For this choice of encryption function, the decryption would work the same way: $m=D(c,P_i)=c \oplus bin(P_i)$. At block 520, the system sends a message requesting the tag's identity and the tag's response to the challenge C. The message includes challenge C.

At block 525, the tag computes $A=f(a, C)$. The value a is the private key of the RFID tag.

At block 530, the tag generates a random value s. Random value s, in one embodiment is generated using a random number generator. In another embodiment, it is generated using a physical unclonable function (PUF). At block 535, in one embodiment, $S=f(s, P_E)$ is calculated. As previously noted, $P_E=(x_E, y_E)$ is a point on the second elliptic curve $E_E(\mathcal{F}_E)$ for (tag id) encryption.

The system, at block 540, computes the value $k_E=f(s, R)$. R is one of the public keys of the RFID system, while s is the random number generated above. At block 542, the RFID tag computes $B=E(n, k_E)$. The value n is the tag ID, while $k_E=f(s, R)$, as noted above.

In one embodiment, the system, at block 545, picks a second random number, u. At block 550 the tag computes $U=f(u, P_O)$. As noted above, $P_O=(x_O, y_O)$ is a point on the third elliptic curve $E_O(\mathcal{F}_O)$ for (tag id) obfuscation. At block 555, the system computes $k_o=f(u, J)$, where u is the second random number and J is the second public key of the RFID reader.

At block 565, the tag computes $G=f(A, k_O)$. $A=f(a, C)$ and is a function of the private key of the tag and the challenge, while $k_o=f(u, J)$.

At block 570, the tag returns the values S, U, B, and G, where $S=f(s, P_E)$, $U=f(u, P_O)$, $B=E(n, k_E)$, $G=f(A, k_O)$. In one embodiment, the tag returns a concatenation of these values. One of the properties of this protocol is that the tag returns a different response each time (so a tag can't be tracked), but a key holder (authorized reader) can determine the identity of the tag based on the returned data.

The reader then performs the following calculations:
(572) Compute $k_E=f(r, S)$ using private key r and provided value S
(574) Compute $k_O=f(j, U)$ using private key j and provided value U
(576) Compute $n=D(B, k_E)$ using computed value $k_E$ and provided value B The value n is the tag ID, which is used at block 580 to request the public key for tag n from a public key directory. At block 585, the public key directory returns the tag's public key Q. The reader then computes (590) $A=D(G, k_o)$, using provided value G, and computed value $k_o$, and verifies that $A=f(c, Q)=f(a, C)$ at block 595. If the verification is correct, then the reader knows that the tag is authentic, and the tag ID is accurate, and can use the tag ID for various look-up, certification, or other functions.

Note that while this example described the functions over an elliptic curve, the cryptographic protocol described can utilize large primes instead. For large primes, each f (x, P) is replaced with f (x, g), where g is a generator for a large prime.

Figure 6:
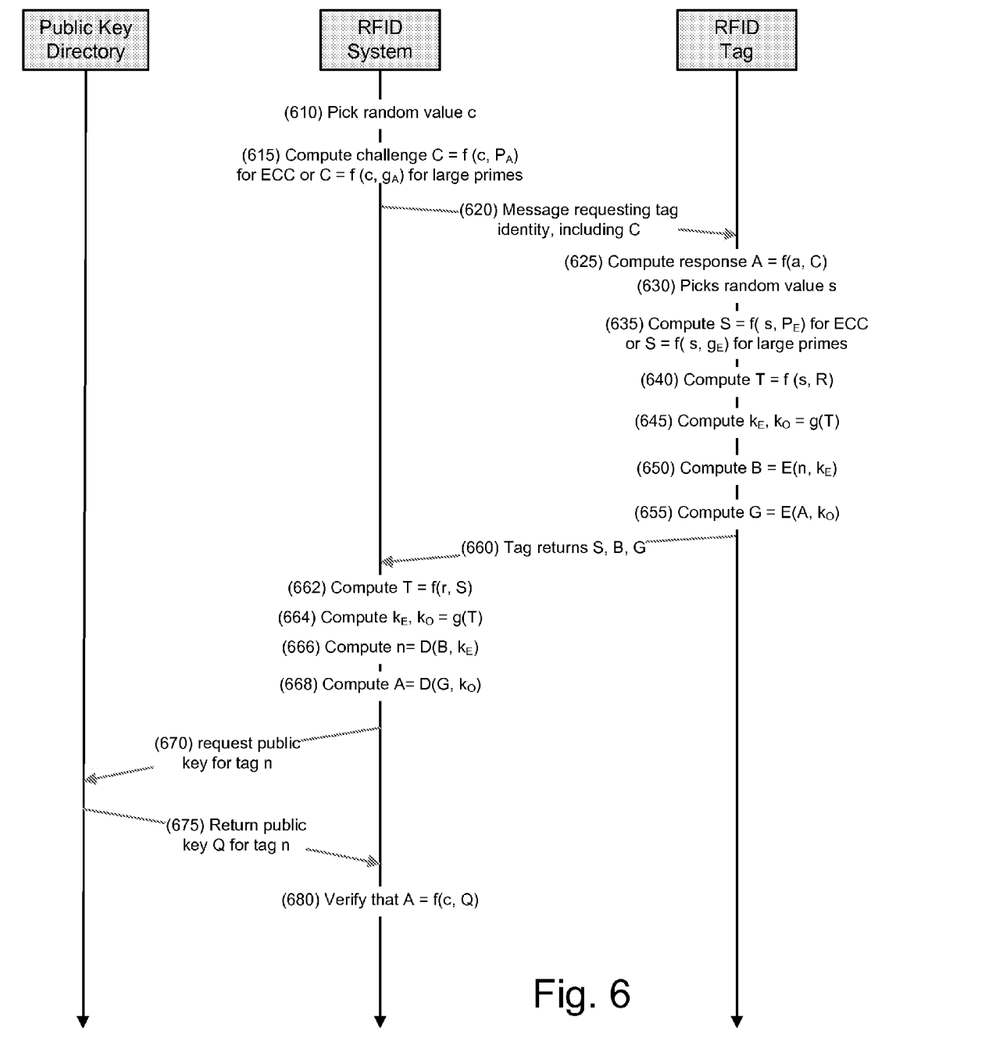
FIG. 6 is a signal flow diagram of one embodiment of using a tag ID protocol for encryption and privacy.

FIG. 6 is a signal flow diagram of one embodiment of using a shortened tag ID protocol for encryption and obfuscation. This shortened process simplifies some of the calculations, by setting points to the same value. At block 610, the RFID system picks a random value c. At block 615, the RFID system computes the challenge, $C=f(c, P_A)$. The challenge, C, is the pair of random value c. At block 620, the system sends a message requesting the tag's identity, including challenge C.

At block 625, the tag computes $A=f(a, C)$. The value a is the private key of the RFID tag.

At block 630, the tag generates a random value s. In one embodiment, random value s may be generated using random number generator. In another embodiment, random value s may be generated using a physically unclonable function (PUF). At block 635, $S=f(s, P_E)$ is calculated. As previously noted, $P_E=(x_E, y_E)$ is a point on the second elliptic curve $E_E(\mathcal{F}_E)$ for (tag id) encryption.

At block 640, $T=f(5, R)$ is calculated. R is one of the public keys of the RFID system, while s is the random number generated above. At block 645, the tag computes $k_E, k_O=g(T)$. The function g( ) computes a string long enough to XOR with n|A. The function $g:k \rightarrow k_1, k_2$ is used to generate two values of length l from an input of length l. The values are pseudo-random, in one embodiment, and it is best to use something cryptographically sound as function g( ).

At block 650, the RFID tag computes $B=E(n, k_E)$. The value n is the tag ID, while $k_E=f(s, R)$, as noted above. At block 655, the tag computes $G=f(A, k_O)$. $A=f(a, C)$ and is a function of the private key of the tag and the challenge.

At block 660, the tag returns the values S, B, and G. In one embodiment, the tag returns a concatenation of these values. $S=f(s, P_E)$, $B=E(n, k_E)$, $G=f(A, k_O)$.

The reader then performs the following calculations:
(662) Compute $T=f(r, S)$ using private key r and provided value S
(664) Compute $k_E \cdot k_O=g(T)$ (666) Compute n=D(B, $k_E$) using computed value $k_E$ and provided value B (668) Compute A=D (G, $k_O$) using provided value G, and computed value $k_O$.

The value n is the tag ID, which is used at block 670 to request the public key for tag n from public key directory. At block 675, the public key directory returns the tag's public key Q. The reader then verifies that A=f (c, Q)=f (a, C), at block 680. If the verification is correct, then the reader knows that the tag is authentic, and the tag ID is accurate, and can use the tag ID for various look-up, certification, or other functions.

Figure 7:
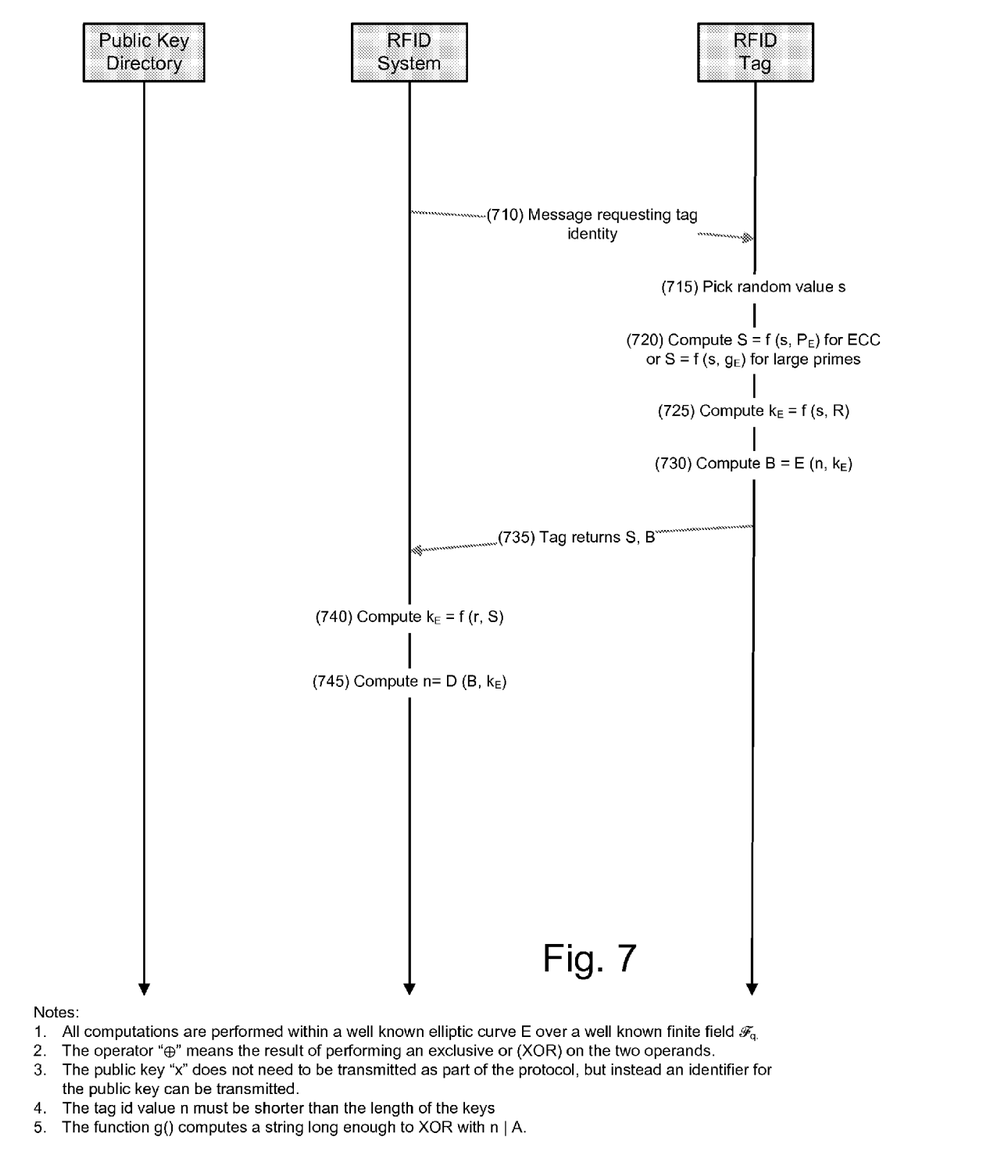
FIG. 7 is a signal flow diagram of one embodiment of using a simplified tag ID protocol for privacy and untraceability.

FIG. 7 is a signal flow diagram of one embodiment of using a simplified tag ID protocol for privacy and untraceability. This cryptographic protocol provides privacy and untraceability, but does not provide authentication. At block 710, the system sends a message requesting the tag's identity.

At block 715, the tag selects random value s.

At block 720, the tag computes S=f (s, $P_E$). As previously noted, $P_E=(x_E, y_E)$ is a point on the second elliptic curve $E_E(\Box_E)$ for (tag id) encryption.

At block 725, the tag computes $k_E$=f (s, R). R is the public key of the reader, while s is the random value.

At block 730, the tag computes B=E (n, $k_E$). The value n is the tag ID, while $k_E$=f (s, R), as noted above. At block 735, the tag returns the values S and B to the reader. Note that since both S and B are at least in part a function of random number s, these values are different for each response.

The reader then performs the following calculations:

(740) $k_E$=f (r, S), where r is the private key of the reader, and S is received from the tag (745) Compute n=D (B, $k_E$) using computed value $k_E$ and provided value B The value n is the tag ID, which can then be used for looking up data about the objects associated with the tag. Note that this process does not provide authentication of the tag. It does, however, provide untraceability and privacy.

Figure 8:
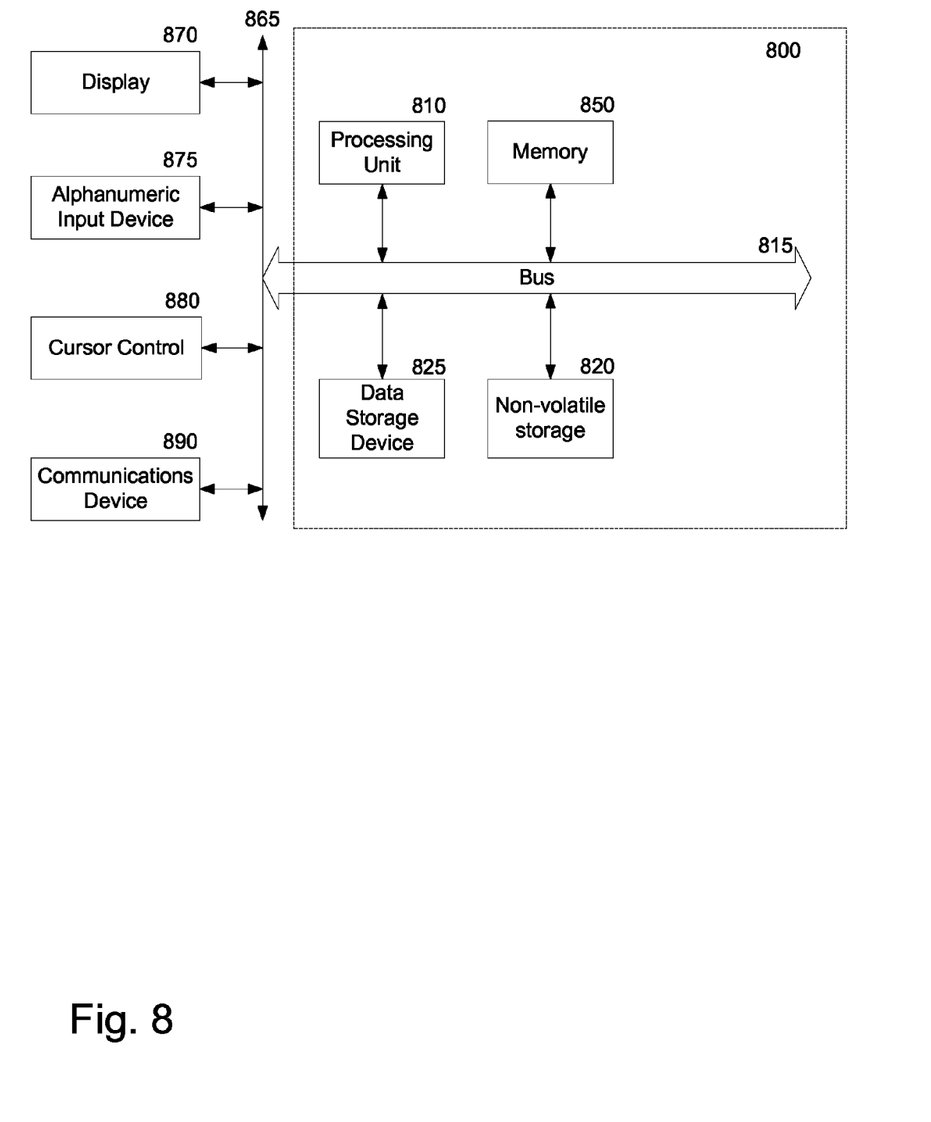
FIG. 8 is a block diagram of one embodiment of a computer system which may be used with the present invention.

FIG. 8 is a block diagram of one embodiment of a computer system which may be used with the present invention. FIG. 8 is one embodiment of a computer system that may be used with the present invention. It will be apparent to those of ordinary skill in the art, however that other alternative systems of various system architectures may also be used.

The data processing system illustrated in FIG. 8 includes a bus or other internal communication means 815 for communicating information, and a processor 810 coupled to the bus 815 for processing information. The system further comprises a random access memory (RAM) or other volatile storage device 850 (referred to as memory), coupled to bus 815 for storing information and instructions to be executed by processor 810. Main memory 850 also may be used for storing temporary variables or other intermediate information during execution of instructions by processor 810. The system also comprises a read only memory (ROM) and/or static storage device 820 coupled to bus 815 for storing static information and instructions for processor 810, and a data storage device 825 such as a magnetic disk or optical disk and its corresponding disk drive. Data storage device 825 is coupled to bus 815 for storing information and instructions.

The system may further be coupled to a display device 870, such as a cathode ray tube (CRT) or a liquid crystal display (LCD) coupled to bus 815 through bus 865 for displaying information to a computer user. An alphanumeric input device 875, including alphanumeric and other keys, may also be coupled to bus 815 through bus 865 for communicating information and command selections to processor 810. An additional user input device is cursor control device 880, such as a mouse, a trackball, stylus, or cursor direction keys coupled to bus 815 through bus 865 for communicating direction information and command selections to processor 810, and for controlling cursor movement on display device 870.

Another device, which may optionally be coupled to computer system 800, is a communication device 890 for accessing other nodes of a distributed system via a network. The communication device 890 may include any of a number of commercially available networking peripheral devices such as those used for coupling to an Ethernet, token ring, Internet, or wide area network. The communication device 890 may further be a null-modem connection, or any other mechanism that provides connectivity between the computer system 800 and the outside world. Note that any or all of the components of this system illustrated in FIG. 8 and associated hardware may be used in various embodiments of the present invention.

It will be appreciated by those of ordinary skill in the art that any configuration of the system may be used for various purposes according to the particular implementation. The control logic or software implementing the present invention can be stored in main memory 850, mass storage device 825, or other storage medium locally or remotely accessible to processor 810.

It will be apparent to those of ordinary skill in the art that the system, method, and process described herein can be implemented as software stored in main memory 850 or read only memory 820 and executed by processor 810. This control logic or software may also be resident on an article of manufacture comprising a computer readable medium having computer readable program code embodied therein and being readable by the mass storage device 825 and for causing the processor 810 to operate in accordance with the methods and teachings herein.

The present invention may also be embodied in a handheld or portable device containing a subset of the computer hardware components described above. For example, the handheld device may be configured to contain only the bus 815, the processor 810, and memory 850 and/or 825. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 810, a data storage device 825, a bus 815, and memory 850, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 810. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method comprising:
 receiving a challenge at a radio frequency identification (RFID) tag from an RFID tag reader;
 initializing the RFID tag based upon a first public key of a first key pair, a second public key of a second key pair, and a tag ID n received from the RFID tag reader;
 calculating $S=f(s, O_E)$, $U=f(u, O_O)$, $B=E(n, k_E)$, $G=f(A, k_O)$, where
  A is a function of the challenge and a private key of the RFID tag,
  s and u are random numbers,
  $k_E$ and $k_O$ are functions of the first public key and the second public key, respectively, and
  $O_E$ and $O_O$ are originators, provided by the reader; and
 returning S, U, B, and G from the RFID tag to the reader, the returned data being unique for each response even when responding to an identical challenge.

2. The method of claim 1, wherein the originators $O_E$ and $O_O$ are points on an elliptical curve.

3. The method of claim 1, wherein the originators $O_E$ and Oo are generators for large primes.

4. The method of claim 1, further comprising:
 receiving, from the RFID reader, a private key of a third key pair, the private key of the third key pair being stored only by the RFID tag.

5. A system comprising:
 a transceiver configured to transmit and receive data, the transceiver further configured to receive a challenge from a reader system;
 an initialization module configured to initialize a tag based upon a first public key of a first key pair, a second public key of a second key pair, and a tag ID n received from the reader system;
 a cryptographic logic module configured to perform cryptographic calculations including calculating $S=f(s, O_E)$, $U=f(u, O_O)$, $B=E(n, k_E)$, $G=f(A, k_O)$, where
  A is a function of the challenge and a private key of a low processing power system (LPPS),
  s and u are random numbers;
  n is an identifier of the LPPS,
  $k_E$ and $k_O$ are functions of a first public key and a second public key of the reader respectively, and
  $O_E$ and $O_O$ are originators, provided by the reader;
 the transceiver further configured to return S, U, B, and G to the reader system, the returned data being unique for each response even when responding to an identical challenge.

6. The system of claim 5, further comprising a secured memory to store the private key of the system and an identifier of the system.

7. The system of claim 5, wherein the cryptographic logic module is further configured to generate the random numbers s and u.

8. The system of claim 5, further comprising:
 a memory to store initialization data, the initialization data including the public keys of the reader, and the identifier of the system.

9. The system of claim 5, wherein the originators OE and 00 are points on an elliptical curve.

* * * * *